United States Patent
Marioni

(10) Patent No.: US 7,967,573 B2
(45) Date of Patent: Jun. 28, 2011

(54) METHOD FOR DRIVING A BIDIRECTIONAL MOTOR TO ROTATE A FLUID CIRCULATION PUMP

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 85 days.

(21) Appl. No.: 12/325,778

(22) Filed: Dec. 1, 2008

(65) Prior Publication Data

US 2009/0129943 A1 May 21, 2009

Related U.S. Application Data

(62) Division of application No. 11/029,533, filed on Jan. 5, 2005, now Pat. No. 7,462,017.

(30) Foreign Application Priority Data

Jan. 16, 2004 (EP) .................................. 04425020

(51) Int. Cl.
*F04B 49/06* (2006.01)

(52) U.S. Cl. .......... 417/45; 417/217; 318/700; 318/715; 318/722

(58) Field of Classification Search ............. 417/45, 417/212, 217, 315; 310/62, 129; 318/700, 318/714, 715, 722, 430, 431
See application file for complete search history.

(56) References Cited

U.S. PATENT DOCUMENTS

| 3,751,179 A | 8/1973 | Wassmann |
| 3,773,432 A | 11/1973 | Chow et al. |
| 3,909,688 A * | 9/1975 | Blaschke et al. .............. 318/700 |
| 5,711,657 A | 1/1998 | Hoffmeier |
| RE37,360 E | 9/2001 | Duncan |
| 6,748,618 B1 | 6/2004 | Darby et al. |
| 7,146,760 B2 * | 12/2006 | Yiu ................................. 40/743 |
| 7,589,483 B2 * | 9/2009 | Darby ...................... 318/400.14 |

FOREIGN PATENT DOCUMENTS

| EP | 0807396 A2 | 11/1997 |
| WO | 00/29660 A | 5/2000 |

* cited by examiner

*Primary Examiner* — Charles G Freay
*Assistant Examiner* — Patrick Hamo
(74) *Attorney, Agent, or Firm* — Akerman Senterfitt

(57) ABSTRACT

A method for starting a motor (14) with a bidirectional rotation direction, to rotate a fluid circulation centrifugal pump (10) having a predetermined optimum hydraulic efficiency depending on the starting rotation direction thereof. The method provides an initial motor (14) starting in either rotation direction, with subsequent pump (10) rotation in the same direction and, subsequently, a periodical interruption and restoration of the motor (14) power feeding as many times (N, N') as to ensure the motor (14) starting, at least one or more times within a predetermined time interval ($T_{tot}$, $T_s$), in the rotation direction which corresponds to the predetermined pump (10) optimum hydraulic speed.

9 Claims, 4 Drawing Sheets

METHOD FOR DRIVING A BIDIRECTIONAL MOTOR TO ROTATE A FLUID CIRCULATION PUMP

FIELD OF APPLICATION

The present invention relates to a method for starting a bidirectional motor, i.e. having an undifferentiated rotation direction on starting, to rotate a fluid circulation centrifugal pump, but having a predetermined optimum hydraulic efficiency depending on the starting rotation direction thereof.

The present invention also relates to a fluid circulation device and to a washing machine for implementing said method.

PRIOR ART

The need to manufacture fluid circulation centrifugal pumps for household or industrial appliances such as washing machines, like dish-washing machines, washers, or for heating or conditioning systems, having the best possible hydraulic efficiency, is well known.

Besides the above-mentioned need, there is also the need, mainly for dish-washing machines or washers, to decrease as much as possible the pump hydraulic power and consequently also the electric power supplied to the motor, in order to reduce therefore both the amount of fluid to be flowing and the energy required for water heating during washing cycles.

To meet both needs, high-hydraulic-efficiency fluid circulation centrifugal pumps have been provided, which are rotated by a high-efficiency synchronous motor with relatively low power absorption.

In particular, the centrifugal pump high hydraulic efficiency is influenced by a predetermined rotation direction, through which the centrifugal pump is started. In other words, in a rotation direction a working fluid circulation highest hydraulic efficiency condition begins, while in the opposite rotation direction, for the same conditions upstream and downstream of the pump, a working fluid circulation lowest hydraulic efficiency condition begins.

The above-mentioned centrifugal pumps, despite the high hydraulic efficiency thereof, have however some drawbacks.

The main drawback is due to the fact that the synchronous motors, through which pumps are rotated, are bidirectional motors, i.e., on starting, the rotor can indifferently be rotated clockwise or anticlockwise.

Consequently, to manufacture high-hydraulic-efficiency centrifugal pumps being started by a synchronous motor, the latter must be equipped with electronic devices allowing the synchronous motor rotation direction to be influenced, in order to achieve the best possible pump hydraulic efficiency.

These devices have a very high cost, both of production and of application to the motor, and this high cost is a not-yet-overcome obstacle, prevailing on the need to optimise energy efficiency, so that the use of monodirectional motors having a low efficiency is preferred.

Moreover, the high cost of these devices prevents a centrifugal pump as above described from being used mainly on a household washing machine belonging to the economy machine category.

High hydraulic efficiency centrifugal pumps have been also provided, wherein the synchronous motor is associated to mechanical or electromechanical devices being capable to impose a desired rotation direction to the motor. However, besides the cost drawback, these mechanical or electromechanical devices have also the drawback of being of particularly complex installation and also very bulky.

The problem of the present invention is thus to provide a rotation method, by means of a bidirectional motor, of a centrifugal pump having a predetermined optimum hydraulic efficiency, depending on the starting rotation direction thereof, with no need for such auxiliary devices neither of the electronic nor of the mechanical or electromechanical type, as to influence the bidirectional motor rotation direction.

SUMMARY OF THE INVENTION

This problem is solved by a method, according to the invention, as previously described providing an initial motor starting in either rotation direction, with subsequent pump rotation in the same direction and, subsequently, a periodical interruption and restoration of the motor power feeding as many times as to increase the probability of the motor starting, at least one or more times within a predetermined time interval, in the rotation direction which corresponds to said optimum pump predetermined hydraulic efficiency.

Therefore, due to the invention, by means of continual interruptions and following starting steps of the bidirectional motor there is an increased probability that, at least for a fraction of the predetermined operation time interval, the motor rotates in the desired rotation direction. It is thus no more necessary to control the real rotation direction of the bidirectional motor.

Further features and advantages of the invention will be apparent from the following description of an embodiment thereof, given by way of non-limiting example with reference to the attached drawings.

DETAILED DESCRIPTION

With reference to the figures, a starting method according to the invention to rotate a fluid circulation centrifugal pump 10 in a washing machine such as for example an household dish-washing machine 12, a washer, a heating system or similar machines equipped with an hydraulic circuit.

The present invention also relates to a fluid circulation device 11 through which the above-mentioned starting method is implemented.

Afterwards, only by way of non limiting example, the method and the fluid circulation device 11 according to the invention will be described with specific reference to an application on a dish-Washing machine 12 to perform a washing program. The present invention also relates to this dish-washing machine.

Figure 1:
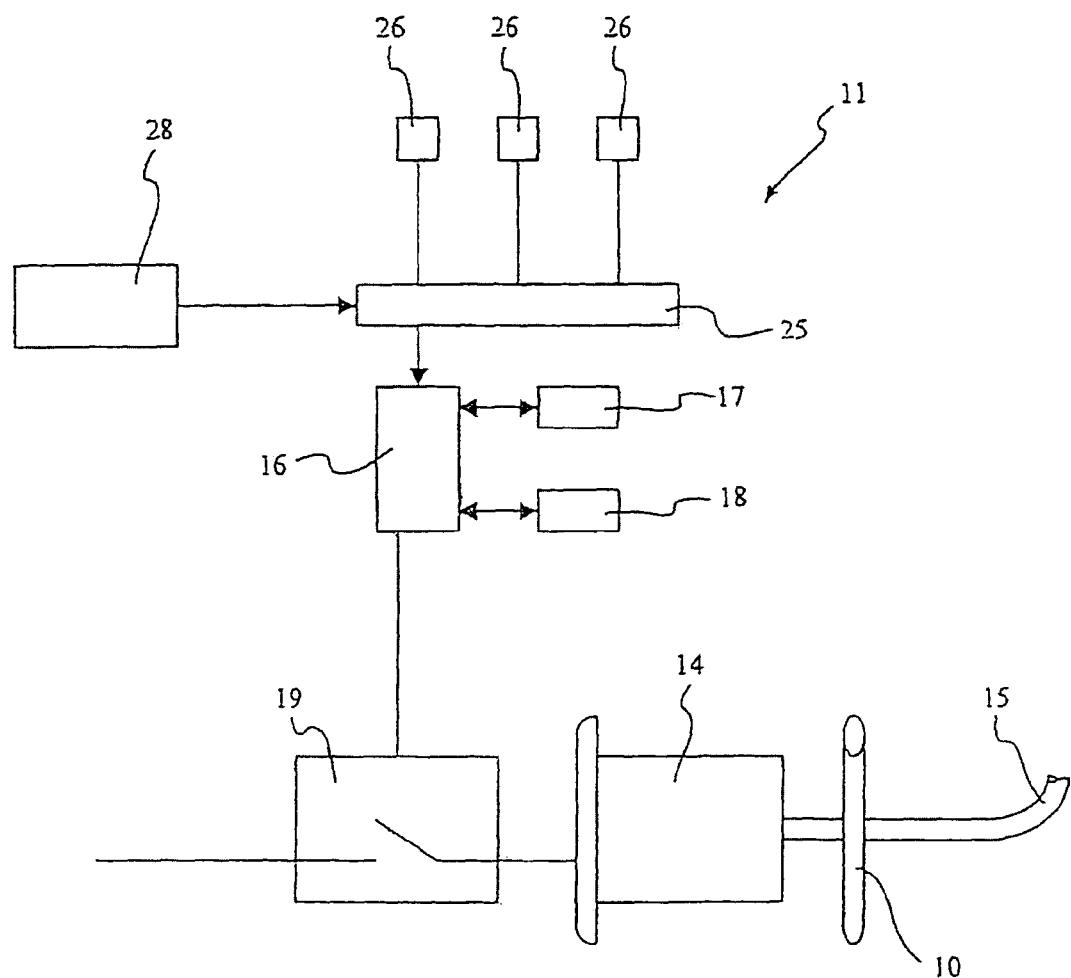
FIG. 1 schematically shows a fluid circulation device for implementing the method according to the present invention.
Figure 2:
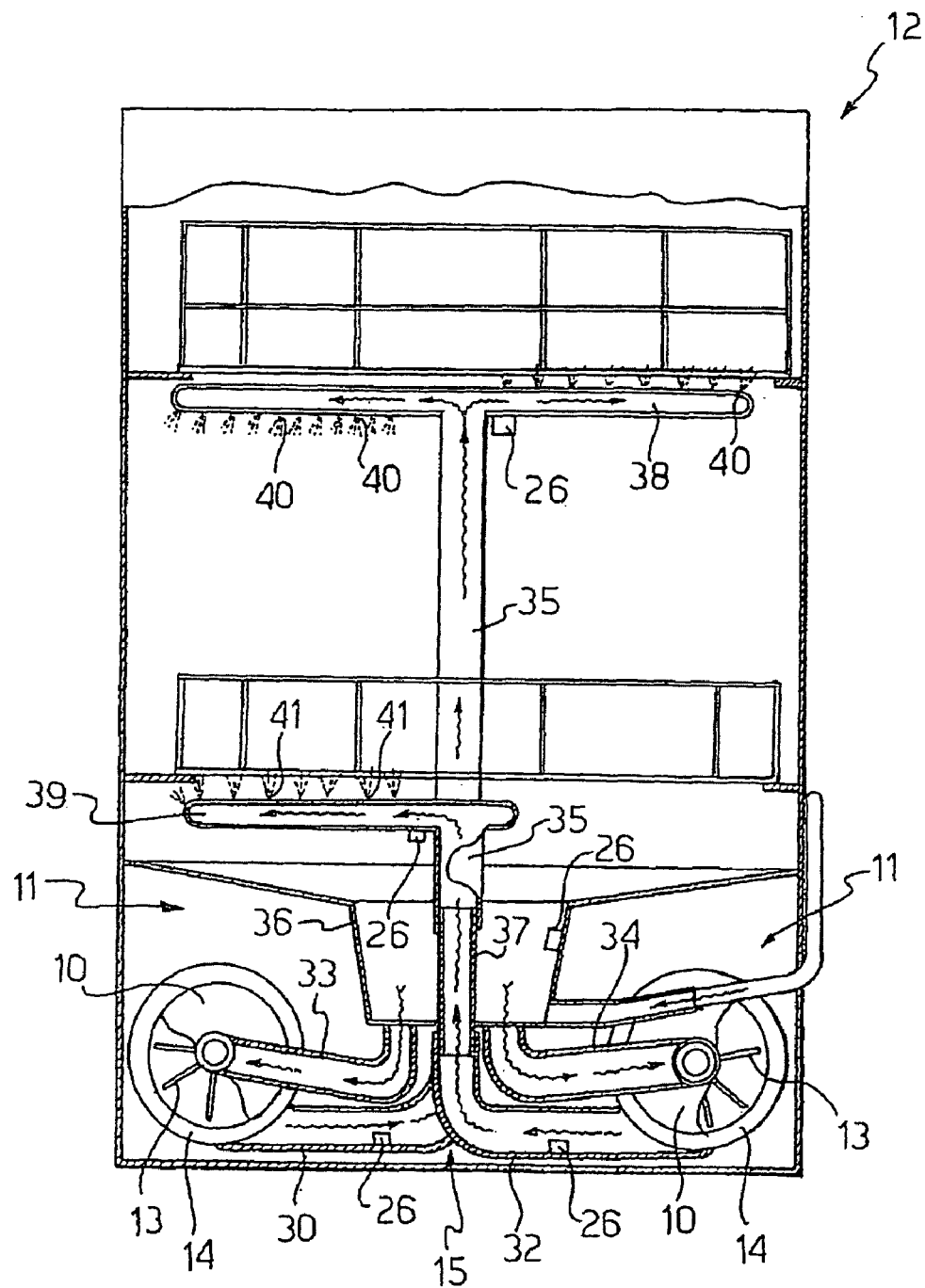
FIG. 2 shows a dish-washing machine wherein the method according to the invention is applied.

The fluid circulation device 11 comprises a centrifugal pump 10, equipped with an impeller 13 (FIG. 2), a synchronous motor 14, preferably a high-efficiency one, which rotates the centrifugal pump 10, an hydraulic circuit 15, a control unit 16 (FIG. 1), a timer 17 and a calculating unit 18 being functionally connected to each other, to impose predetermined starting times of the synchronous motor 14. The control unit 16 is connected to a commutation switch 19 of the electric motor 14 power feeding. The fluid circulation device 11 does not comprise either electronic or electromechanical components to impose a predetermined rotation direction to the electric motor 14.

In particular, the circulation pump 10 is optimised and traditionally 25 configured so to have the best possible hydraulic efficiency when it is started in a predetermined rotation direction.

When the centrifugal pump 10 rotates in the predetermined direction, the fluid motion is in a highest speed condition and it has, for the same energy consumption, a pressure and a flow rate being much higher than the ones occurring when the centrifugal pump 10 rotates in the opposite direction. In a lowest speed condition, i.e. when the rotation direction is inverted, the pressure and the flow rate drastically decrease, for example by about 50%.

On the contrary, the synchronous motor 14 has, as it is well known, an undifferentiated rotation direction, i.e., when being started, it indifferently rotates with the same efficiency in either rotation direction.

Consequently, components to impose the rotation direction to the synchronous motor 14 not being provided, when the latter is started, the centrifugal pump 10 is rotated in the same direction as the synchronous motor 14 rotation. In other words, the synchronous motor 14 influences the rotation direction of the centrifugal pump 10.

In order to ensure the centrifugal pump 10 operation in the rotation direction corresponding to the optimum hydraulic efficiency thereof, the method according to the invention provides that the synchronous motor 14 power feeding, after being started, is periodically interrupted and restored.

Preferably, a waiting time, which is necessary for the centrifugal pump 10 shutdown, is provided between the interruption and the restoration of the synchronous motor 14 power feeding.

This series of continual interruptions and starting steps of the synchronous motor 14 is periodically repeated for such a predetermined number N of times as to ensure, at least one or more times within a predetermined time interval, the synchronous motor 14 starting in the rotation direction which corresponds to the highest hydraulic efficiency of the centrifugal pump 10.

The method according to the invention, besides being of very simple implementation, is also very versatile and it can be performed in a plurality of different embodiments.

Figure 3:
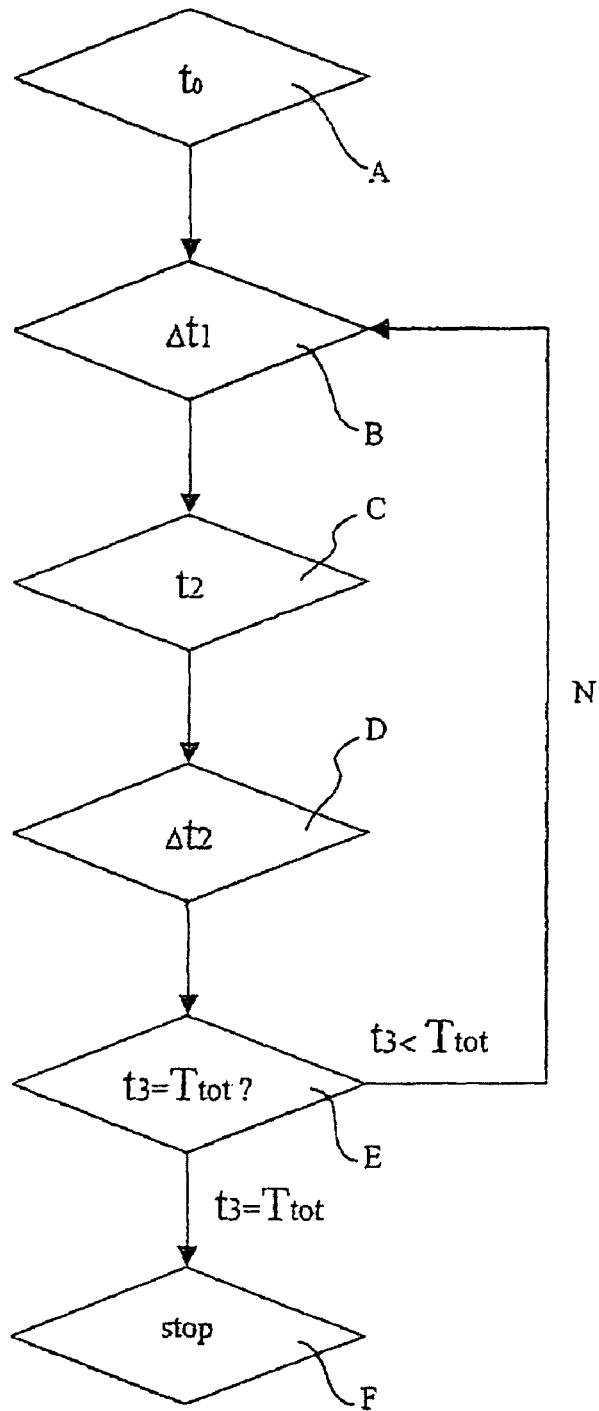
FIGS. 3 and 4 are flow charts of the method according to the invention.

A first embodiment of the method according to the invention is now shown with reference to FIG. 3 by means of a first flow chart.

In this application the method provides that an operation time interval $T_{tot}$ of the centrifugal pump 10 is initially imposed for the fluid circulation in the corresponding circuit 15.

In a first step A, at the time $t_0$, the synchronous motor 14 start-up is operated by the control unit 16.

The synchronous motor 14 is thus started in either rotation direction, and in this condition it is kept rotating for a first time fraction $\Delta t_1$ (step B), conveniently calculated to allow the centrifugal pump 10 to steadily rotate.

Afterwards, at a predetermined instant $t_2$ (step C) the synchronous motor 14 power feeding is interrupted by means of the commutation switch 19, and a second time fraction $\Delta t_2$ is let passing, which is conveniently calculated by the calculation unit 18 to wait the real shutdown of the centrifugal pump 10 (step D).

Once the centrifugal pump 10 is also shut down, the synchronous motor 14 is started again at an instant $t_3$ (step E) by the control unit 16.

This series of operations or steps from B to E is repeated N times in the predetermined time interval $T_{tot}$, in order to obtain N interruptions, and respective N starts, of the centrifugal pump 10.

Consequently, when the instant $t_3$ coincides with the predetermined time interval $T_{tot}$ ($t_3=T_{tot}$), the centrifugal pump 10 is definitely shut down in the final step F.

Preferably in this application, the number N of interruptions and starts of the synchronous motor 14 is chosen according to a predetermined probability rate so that in said time interval $T_{tot}$ the rotation direction of the synchronous motor 14 corresponds to the direction in which the centrifugal pump 10 has the highest hydraulic efficiency.

Consequently, in order to have at least a probability of about 50% that this event occurs, the overall number N of interruptions and starts is chosen sufficiently high.

According to the invention, a time alternance occurs between a highest and a minimum rotation speed of the centrifugal pump 10, being certain that the latter rotates in the preferential rotation direction for about N/2 times in the time interval $T_{tot}$ and thus for an overall time period of about $T_{tot}/2$.

According to an alternative embodiment of the invention, the number N of interruptions and starts is such as to ensure a random alternance of the two speeds, not influenced by a predetermined probability.

It must also be noticed that during the predetermined time interval $T_{tot}$ the real rotation direction of the synchronous motor 14 must not be controlled.

In a second embodiment of the method according to the invention the fluid circulation device 11 comprises a centrifugal pump 10 provided with such convenient known constructive asymmetries as to influence the probability for the synchronous motor 14 to rotate more in one direction than in the other.

These constructive asymmetries can be both mechanical and hydraulic and electric.

For example, it is known to provide a mechanical asymmetry by conveniently bending the blades of the impeller 13 in order to increase the power absorbed by the centrifugal pump 10, when it is rotated in the direction corresponding to the lowest hydraulic efficiency.

The method is implemented with the same embodiments described with reference to the diagram of FIG. 3.

Therefore, by cyclically repeating the interruption and start of the synchronous motor 14 in the predetermined time interval $T_{tot}$, it is possible to obtain a probability rate comprised between 50% and 99% that the centrifugal pump 10 rotates in the highest hydraulic efficiency direction.

Figure 4:
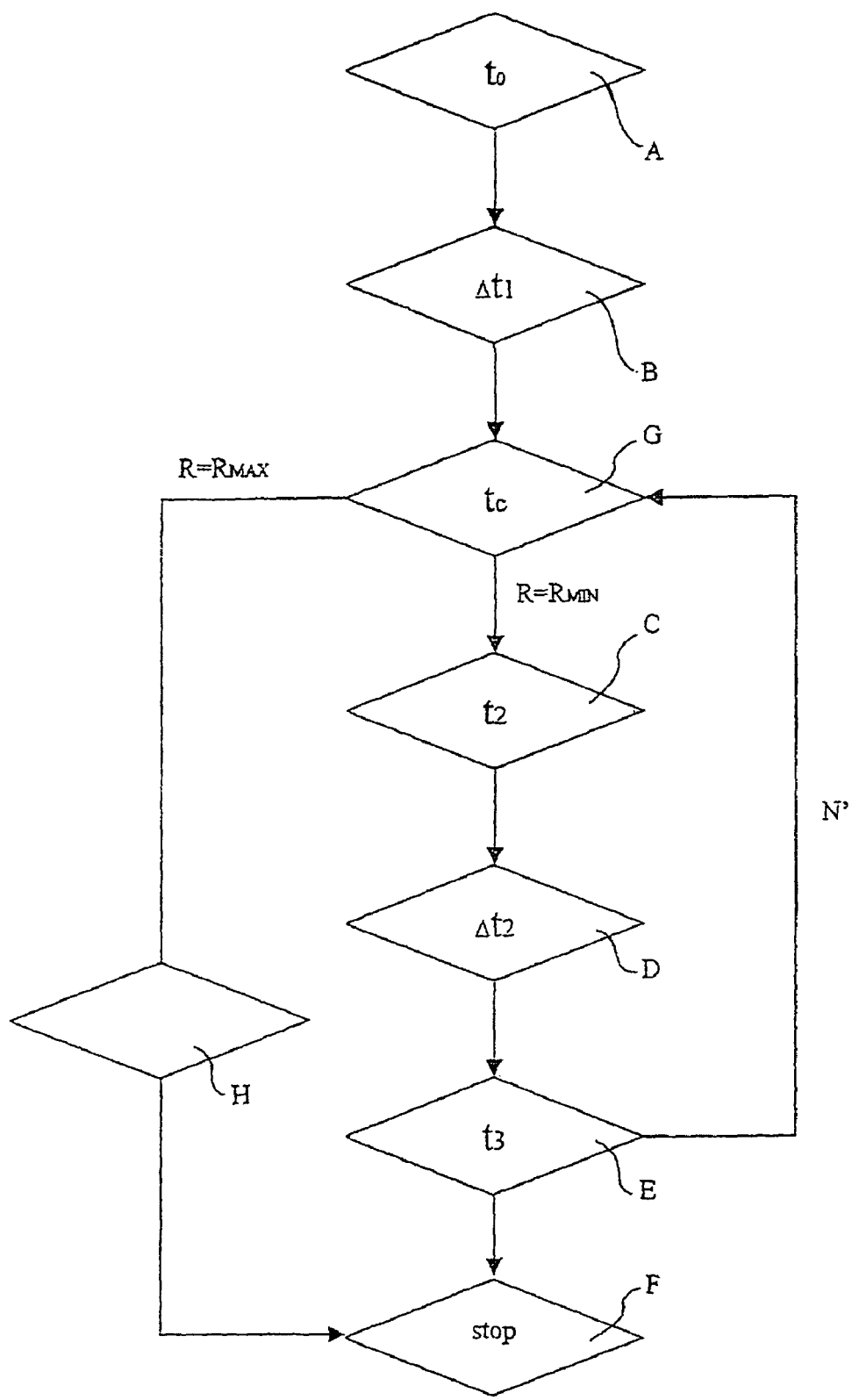

FIG. 4 shows a third embodiment of the method according to the present invention, with reference to a second flow chart.

In this application the fluid circulation device 11 comprises a control circuit 25 of the centrifugal pump 10 associated to sensors 26, which is functionally connected to the control unit 16.

The control circuit 25 is of the known type and it is configured to detect, by means of the sensors 26, the hydraulic speed of the centrifugal pump 10, by measuring for example the flow rate or the pressure of the fluid outputted from the centrifugal pump 10, or the noise produced during the operation thereof, or the current absorbed by the motor or other similar quantities.

The control circuit 25 is thus capable to indirectly detect the rotation direction of the synchronous motor 14.

In particular, in this application, the method provides that a time interval $T_s$ of iterative interruptions and starts of the synchronous 14 is imposed. I.e. the interruption and start are periodically repeated in the time interval $T_s$ in order to ensure that at least one time in this interval $T_s$ the centrifugal pump 10 rotates in the direction corresponding to the highest hydraulic efficiency value.

The method develops as follows.

In the first step A, at the time $t_0$, the synchronous motor 14 start-up is operated by the control unit 16. The synchronous motor 14 is started in either rotation direction, and it is kept in this condition for the first time fraction $\Delta t_1$ (step B).

Afterwards, at an $t_c$ (step C) the control circuit 25 detects the real hydraulic speed of the centrifugal pump 10 and on the basis of the detected hydraulic speed, it starts or it does not starts the control unit 16 in order to start the commutation switch 19.

In particular, if the centrifugal pump 10 is rotating in the direction corresponding to the lowest hydraulic efficiency ($R=R_{min}$), the synchronous motor 14 is shut down (step C) and, after the centrifugal pump 10 shutdown (step D), it is started again at the instant $t_3$ (step E).

The cycle is repeated N' times until at the instant $t_c$ it is detected that the real efficiency of the centrifugal pump 10 corresponds to the highest efficiency ($R=R_{max}$). Under this condition, the control unit 16 is shut down and the synchronous motor 14 is kept on (step H) for all the time required until the centrifugal pump 10 is shut down (step F).

It is well-grounded to consider that it is not necessary to wait a long time from the synchronous motor 14 starting (step A) for the latter to be started in the rotation direction of the centrifugal pump 10 corresponding to the highest hydraulic efficiency value.

In a forth embodiment of the method according to the invention, which is similar to the above-described one, the method according to the invention provides that the control unit 16 is inhibited or not at the instant $t_c$ (step G) on the basis of predetermined programs of minimum or highest speed of the centrifugal pump 10.

In this case, the control circuit 25 checks at the instant $t_c$ if the real speed of the centrifugal pump 10, after starting the synchronous motor 14, corresponds to a programmed speed, minimum or highest, and on the basis of the performed detection it inhibits or it does not inhibits the control unit 16.

The cycle of interruptions and starts N' of the centrifugal pump 10 thus continues until the latter rotates in the rotation direction corresponding to the desired speed.

It must be noticed that in this forth embodiment the predetermined optimum hydraulic efficiency of the centrifugal pump 10 can be both a lowest hydraulic efficiency and a highest hydraulic efficiency, according to the required fluid speed.

It is also possible to configure the control circuit 25 to obtain each time a predetermined alternance of a highest hydraulic speed and of a lowest hydraulic speed.

The main advantage of the method according to the invention is that it allows the control of the synchronous motor 14 rotation direction to be avoided, thus avoiding the use of complex and expensive devices, and it ensures the centrifugal pump 10 operation, at least for half the overall operation time, in a highest hydraulic efficiency condition.

Moreover, the method according to the invention advantageously performs a continual time alternance of the centrifugal pump 10 in either rotation direction, which not only does not damages the overall efficiency of the centrifugal pump 10 but it is also advantageous in many cases, as it will be described hereafter, for example for the fluid circulation in a dish-washing machine.

A further advantage is that, by the method according to the present invention, it is possible, by means of known simple sensor means 26, to obtain the rotation direction corresponding to the highest efficiency, in a relatively short time period.

Another advantage is that it is possible to alternate according to predetermined embodiments and in the desired times the hydraulic speed of the centrifugal pump 10 between two discrete highest and lowest values, without using complex adjustment devices.

A further advantage of the present invention is to manufacture a fluid circulation device comprising a high-efficiency asynchronous motor 14 to start the centrifugal pump 10, having a considerably reduced cost, of easy application on a corresponding washing machine, such as the dish-washing machine 12, or a heating or conditioning system or the like, and not requiring complex components for implementing the method.

Another advantage of the device according to the present invention is that functional components can be used, such as the switch, the calculation unit, the timer, pump control sensors, for example pressure switches and sensors of the current circulating in the motor, commonly already used in the above-mentioned machines.

A dish-washing machine 12 is now described, as above mentioned, which is an object of the present invention and wherein the method according to the invention is implemented.

The dish-washing machine 12 is equipped with two reduced-cost fluid circulation devices 11, equal to each other, wherein each centrifugal pump 10 is rotated by the corresponding synchronous motor 14.

The pumps 10 comprise each a delivery pipe 30, 32, and a suction pipe 33, 34, which draws water from a collecting trap 36. In this specific case, the left centrifugal pump 10 feeds the water on an upper washing plane, by means of a first whirlpool 38, and the right centrifugal pump 10 feeds the water on a lower washing plane, by means of a second whirlpool 39. The whirlpools 38, 39 are traditionally connected by means of respective central pipes 35, 37 to delivery pipes 30, 32 of the centrifugal pumps 10. Each whirlpool 38 and 39 is also equipped with corresponding nozzles 40, 41 to deliver water in the sprayed shape.

The central pipes 35, 37, the whirlpools 38, 39, the nozzles 40, 41 and the collecting trap 36 form the hydraulic circuit 15 of the fluid circulation device 11.

The centrifugal pumps 10 and the corresponding water circulation hydraulic circuits 15 are optimised to have the highest efficiency, i.e. the highest pressure and also the highest flow rate of the water outputted by the corresponding nozzles 40, 41, when the pumps 10 are rotated in a predetermined direction, for example clockwise.

On the contrary, when the rotation occurs anticlockwise, a drastic reduction by about 50% of the power of the corresponding centrifugal pump 10 occurs and thus a considerable decrease of the pressure of the water outputted by the nozzles 40, 41.

Each centrifugal pump 10 is also equipped with the above-mentioned sensors 26, managed by the control circuit 25, which are preferably associated to the respective delivery pipes 30, 32 to check the hydraulic speed of the centrifugal pump 10. These sensors 26 comprise for example pressure sensors, acoustical or accelerometric transducers to determine the cavitation acoustical spectrum, flow rate sensors, sensors of the current flowing in the motor and the like.

Sensors 26 placed on the whirlpools 38, 39 are also provided to detect the rotation speed thereof, and also a sensor 26 in the collecting trap 36 to detect the water level.

The dish-washing machine 12 also comprises a programming unit 28 (FIG. 1), functionally connected to the control circuit 25, wherein predetermined washing programs are set, for example normal washing, intensive washing, delicate washing, or rinsing, wherein each program requires a different flow rate and pressure of the water outputted from the nozzles 40, 41.

To perform one of said washing programs, in the dish-washing machine 12, the method according to the invention according to any of the above-described embodiment is implemented.

A first normal washing program, requiring an average water pressure and flow rate, is configured to perform, by means of the control unit 16, a series of periodical interruptions and following starts of the synchronous motor 14 for N times, as described by the diagram of FIG. 3.

A washing program is thus obtained, wherein the centrifugal pump 10 alternatively operates for about half the time interval $T_{tot}$ in a lowest speed condition, and similarly for about half the time $T_{tot}$ in a highest speed condition, and it has thus a reduced water consumption.

Moreover, with this washing program a random and continual alternance of the pressure of the water outputted from the nozzles 40, 41 is obtained between a highest value and a lowest value.

This pressure alternance determines a continual variation of the behaviour of the water outputted from the nozzles 40, 41. When the pressure is the highest, the water is outputted as a very strong jet towards a predetermined direction, while when the pressure is the lowest, the jet is less regular and more diffused and it can reach areas which would not otherwise be reached. A uniformly distributed jet and a more complete dish washing can thus be advantageously obtained.

A second intensive washing program, requiring a high water consumption, is configured to perform, by means of the control unit 16, a series of periodical interruptions and following starts of the synchronous motor 14 for N' times, until the sensors 26 detect a highest water flow rate. Once the highest flow rate has been detected, the control unit 16 is inhibited and a constant highest pressure of the water outputted by the nozzle 40, 41 is thus obtained. In this case the embodiment of the method according to the invention described in FIG. 4 is thus applied.

Similarly, the embodiment of the method according to the invention described in FIG. 4 is applied when a third rinse or delicate washing program requiring a lowest water consumption is started. In this case, the synchronous motor 14 is cyclically interrupted and started for N' times until the sensors 26 detect a lowest water flow rate. Once the lowest flow rate has been detected, the control unit 16 is inhibited and a constant lowest pressure of the water outputted by the nozzle 40, 41 is thus obtained.

The main advantage of the dish-washing machine 12 is that a high-efficiency synchronous motor can be used without motor control electronic devices, and thus a very reduced cost can be obtained.

The dish-washing machine 12 has also the advantage that the centrifugal pump 10 can operate at two different operating speeds, the highest and the lowest without requiring the use of complex hydraulic power adjustment devices, but simply acting on the switch and the start of the synchronous motor 14 power feeding.

The invention claimed is:

1. A method for starting a motor with a bidirectional rotation direction, to rotate a fluid circulation centrifugal pump having a predetermined optimum hydraulic efficiency depending on the starting rotation direction thereof, the method comprising the steps of:
   initially starting the bidirectional motor in either rotation direction without employing electronic or electromechanical components to impose a predetermined rotation direction to said motor, with subsequent pump rotation in the same direction; and
   periodically interrupting and restoring power fed to the motor to increase the possibility of the motor starting at least one or more times within a predetermined time interval, in the rotation direction which corresponds to said optimum pump predetermined hydraulic efficiency,
   wherein the number of times that the motor power is interrupted and restored is calculated to ensure, in said predetermined time interval, a predetermined probability of at least 50% that the bidirectional motor is started in the rotation direction corresponding to said centrifugal pump predetermined optimum hydraulic efficiency, and
   wherein said centrifugal pump has constructive asymmetry to influence said predetermined probability, increasing it to a value comprised between 50% and 99%.

2. The method according to claim 1, wherein the number of times of interruptions and starts of the bidirectional motor is such as to ensure a random alternance of either motor rotation direction.

3. The method according to claim 1, wherein said constructive asymmetry is of the mechanical type and is provided by bending the blades of an impeller of the centrifugal pump in order to increase the power absorbed by the centrifugal pump when it is rotated in the direction corresponding to the lowest hydraulic efficiency.

4. The method according to claim 1, wherein a hydraulic speed of the centrifugal pump in said predetermined time interval is detected by control means.

5. The method according to claim 4, wherein the control means inhibit the interruption and the periodical restoration of the motor power feeding when they detect that the real hydraulic efficiency of the pump corresponds to said predetermined optimum hydraulic efficiency.

6. The method according to claim 1, wherein said predetermined optimum hydraulic efficiency determines a highest fluid circulation speed.

7. The method according to claim 1, wherein said predetermined optimum hydraulic efficiency determines a lowest fluid circulation speed.

8. The method according to claim 5, wherein said control means inhibit the interruption and the periodical restoration of the bidirectional motor power feeding according to predetermined fluid hydraulic speed programs.

9. The method according to claim 1, wherein said bidirectional motor is a high-efficiency synchronous motor.

* * * * *